United States Patent [19]

Moore, Jr.

[11] Patent Number: 5,072,578
[45] Date of Patent: Dec. 17, 1991

[54] ACCELERATION OVERRIDE MEANS FOR A FUEL CONTROL
[75] Inventor: Robert G. Moore, Jr., Granger, Ind.
[73] Assignee: Allied-Signal Inc., Morristown, N.J.
[21] Appl. No.: 450,797
[22] Filed: Dec. 14, 1989
[51] Int. Cl.$^5$ .............................................. F02C 7/28
[52] U.S. Cl. .................................................. 60/39.281
[58] Field of Search ........................ 60/39.161, 39.281

[56] References Cited
U.S. PATENT DOCUMENTS

| 3,438,199 | 4/1969 | McGinnis et al. | 60/39.281 |
| 3,516,250 | 6/1970 | Moore | 60/39.161 |
| 3,587,229 | 6/1971 | Peczkowski | 60/39.161 |
| 3,777,478 | 12/1973 | Moore | 60/39.281 |

Primary Examiner—Louis J. Casaregola
Attorney, Agent, or Firm—Leo H. McCormick, Jr.; Larry J. Palguta; Robert A. Walsh

[57] ABSTRACT

In a fuel control (34) for a gas turbine engine (20), override means (200, 402) which allows additional fuel to be supplied to a combustion chamber (26) outside a fuel supply schedule in response to a desired acceleration input. The amount of additional fuel supplied to the combustion chamber (26) is a function of the actual speed of the turbine corrected for air inlet temperature of the gas turbine (20).

10 Claims, 5 Drawing Sheets

ACCELERATION OVERRIDE MEANS FOR A FUEL CONTROL

This invention relates to a means for providing additional fuel to a combustion chamber of a turbine engine different from a set fuel supply schedule as a function of actual speed of a compressor corrected for temperature and altitude.

Gas turbine engines used to power helicopters normally have a built in fuel schedule which is based on operation at sea level and a temperature of 59° F. U.S. Pat. Nos. 3,587,229 and 3,777,478 disclose typical fuel control systems for such gas turbine engines. These prior art systems have a single fuel schedule for all altitudes and temperature. Unfortunately helicopters operate at varying elevations from sea level to approximately 20,000 feet in elevation. If the fuel schedule is modified to account for high elevation operation in order to obtain the maximum power from the turbine, compressor surge may be encoutered during acceleration. Further, in helicopters which are powered by two turbine engines in order to meet certain requirements it is necessary that all operations of the helicopter can be achieved during an emergency through the power of a single gas turbine engine. During such an emergency it may be necessary to temporarily operate the single gas turbine engine at a speed which exceeds the maximum achievable through a fuel supply schedule which is set for the gas turbine engine.

The instant invention includes sensing means which are responsive to an acceleration request imposed on the single gas turbine engine and which allow additional fuel to be supplied to the combustion chamber to meet the acceleration request. The additional fuel being supplied to the combustion chamber as a function of the actual speed of the gas turbine corrected for both temperature and altitude of the turbine engine.

In one embodiment of the invention, a pressure switch closes a normally opened bleed orifice to produce an increase in fluid pressure of the operational fluid. This increase in fluid pressure acts on a bellows in a metering valve to allow additional fuel to flow to a combustion chamber in the turbine engine to meet an acceleration demand.

In other embodiments the mechanical pressure switch is replaced with a torque motor, a stepped motor or a proportional solenoid which responds to an input from a computer to close a bleed valve and allow the fluid pressure in the operational fluid pressure to increase and produce an output signal which activates a metering valve to all additional fuel to flow to a combustion chamber in a turbine engine.

It is an object of this invention to provide a fuel control system for a gas turbine with means to increase the maximum fuel supplied to a combustion chamber when the ratio of the compressor discharge pressure to the fluid pressure of the surrounding environment exceeds a relationship established in a built in fuel supply schedule.

An advantage of this invention is in the use of a relative low cost pressure switch which allows additional fuel to be supplied to a combustion chamber during acceleration of a gas turbine engine to meet an operation demand outside a normal range of operation.

These and other advantages and objects should be apparent from reading this specification while viewing the drawings wherein:

Figure 1:
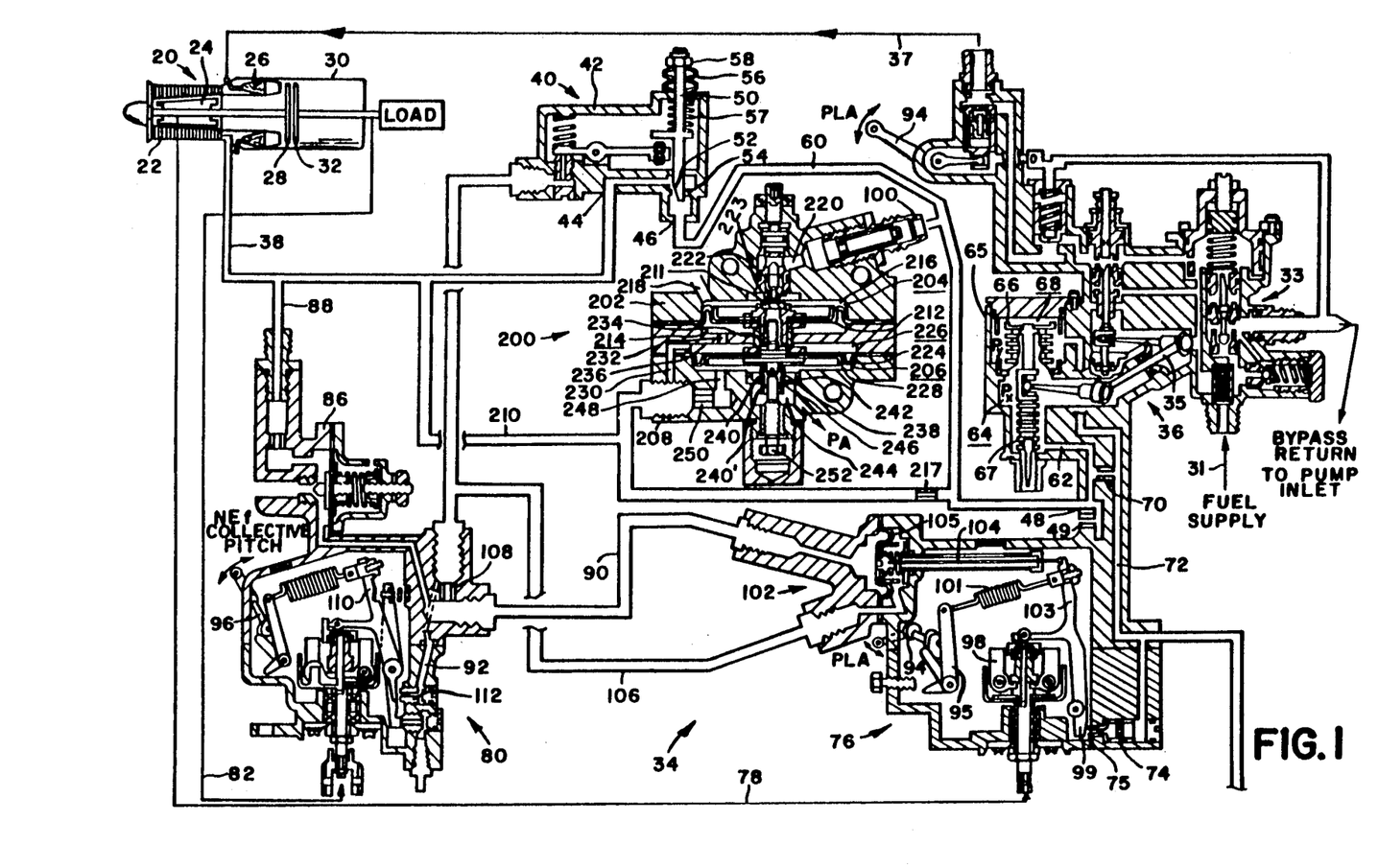
FIG. 1 is schematic illustration of a gas turbine engine having a fuel control system made according to the principles of the invention disclosed herein.

The gas turbine 20 shown in FIG. 1 has a gas generator section 22 including an air compressor 24, combustion chamber 26 and turbine 28 connected to drive compressor 24. A power generating section 30 includes a free or power turbine 32 which rotates independent of turbine 28 in response to exhaust gases directed therethrough from the combustion chamber 26. The free turbine 32 is suitably connected to an external load or power absorbing device which for the purpose of the following description will be assumed to be the rotatable blades or air foils of a helicopter not shown.

The control system 34 for engine 20 except for the temperature compensator 40 and override means 200 of the present invention is convention and of the type disclosed in U.S. Pat. No. 3,587,229 which is incorporated by reference for specific details of operation and structure not essential to an understanding of the present invention. However, briefly stated, the control system 34 includes a fluid pressure responsive metering valve 36 adapted to control fuel flow from a source 31 through a fuel supply conduit 37 connected to discharge fuel to combustion chambers 26. For control purposes, an air supply conduit 38 communicates compressor discharge air at a fluid pressure $P_c$ to metering valve 36.

A temperature compensator 40 has a housing 42 with an inlet port 44 connected to conduit 38 and an outlet port 46 connected to an inlet 48 of the metering valve 36. A stem 50 retained in housing 42 has a contoured face 52 that extends into a seat 54. A spring 57 acts on and urges face 52 toward seat 54 to restrict the flow of compressor discharge air to the outlet port 46 to establish a fluid pressure $P_x$ in the resulting operational air or fluid. Bi-metal washers 56 located between adjusting nut 58 on stem 50 and housing 42 respond to changes in temperature to oppose the positioning force of spring 57 to compensate for temperature changes in the surrounding environment and maintain the fluid pressure $P_x$ at a substantially constant level for a given temperature.

The operational fluid is simultaneously communicated from the temperature compensator 40 by conduit 60 to inlet 48 of housing 65 of in the metering valve 36 and inlet 202 in the fuel schedule override means 200.

The operational fluid is communicated from inlet 48 by passageway 62 to chamber 64 which houses bellows means 66. Bellow means 66 separates chamber 64 from chamber 68 has a first side which is exposed to the fluid pressure in chamber 64 and a second side which is exposed to the fluid pressure in chamber 68. A restrictive orifice 70 controls the rate of flow of operational fluid from passageway 62 to passageway 72. Passageway 72 is connected to a deceleration restrictor 74 located in governor 76 and chamber 68 in the metering valve 36.

Governor 76 is connected by drive cable 78 to sense the speed of turbine 28 while a power turbine governor 80 senses speed of power turbine 32 by drive cable 82. Governor 80 is connected to generator governor 76 by air passage 90 which imposes a reset control on governor 76.

An air pressure regulator 86 is supplied compressor discharge air at pressure $P_c$ via a branch passage 88 leading from supply conduit 38. The air pressure regulator 86 regulates the compressor discharge air supplied thereto to maintain a controlled source of air at pressure $P_r$ which is discharged to gas generator governor 76 via passage 90 and to power turbine governor 80 via a passage 92 downstream from restriction 108.

Manually actuated control levers 94 and 96 connected to gas generator governor 76 and power turbine governor 80, respectively, provide reference inputs thereto.

As described in U.S. Pat. No. 3,587,229, the gas generator governor 76 includes centrifugal speed weights 98 which impose a force against coacting pivotally mounted lever 103 whose movement controls the flow of operational fluid through vent opening of restrictor 74 to vary the effective flow areas thereof and thus the development of a control air fluid pressure $P_y$ which is communicated to chamber 68 in the metering valve 36. The lever 103 is loaded with a reference force derived from a tension spring 101 connected between lever 103 and a lever 95 actuated by control lever 94.

A governor reset mechanism 102 includes a rod 104 one end of which is connected to lever 103 and the opposite end of which is fixedly secured to a diaphragm 105. The diaphragm 105 has one side exposed to regulated fluid pressure $P_r$ from regulator 86 supplied thereto via passage 90 while a branch passage 106 downstream from restriction 108 in passage 90 communicates fluid pressure $P_r$ to the opposite side of diaphragm 105. Air passage 92 vents passage 106 downstream from restriction 108 to power turbine governor 80. Governor 80 has an output lever 110 adapted to control the effective flow area of vent 112 in passage 92 and the air pressure $P_e$ imposed on diaphragm 105. The lever 110 is positioned by an opposing reference input and turbine 32 speed generator forces to control the fluid pressure differential $P_r - P_e$ across the diaphragm 105. The resulting output force of the diaphragm 105 is applied by rod 104 to lever 103. Thus, the speed control for gas generator turbine 28 is derived from gas generator governor 76 as a function of the fixed reference input force established by the position of the power lever 94 and the existing speed force of turbine 28 generated by weights 98 which results in accurate and stable control for the gas generator speed.

Figure 6:
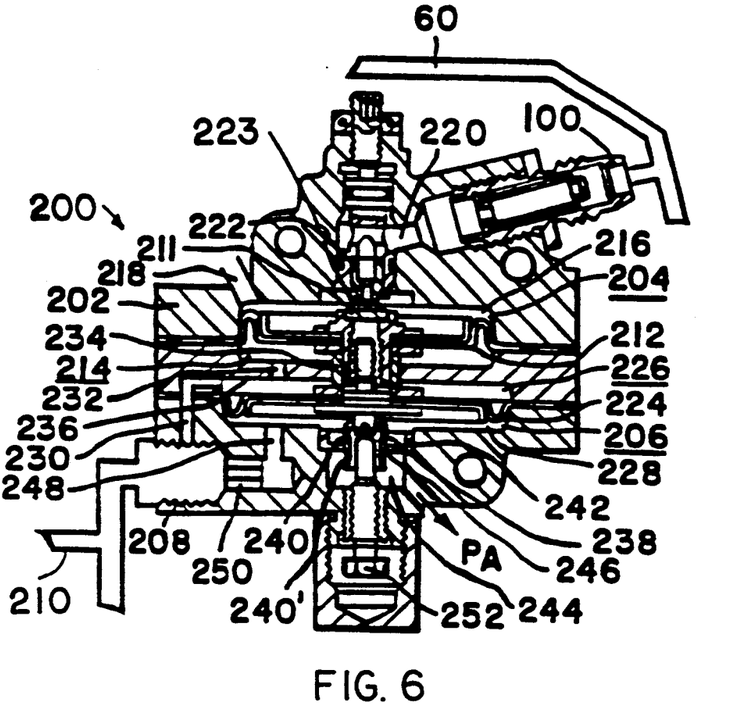
FIG. 6 is an enlarged view of the fuel schedule override means of FIG. 1 in an opened position.
Figure 7:
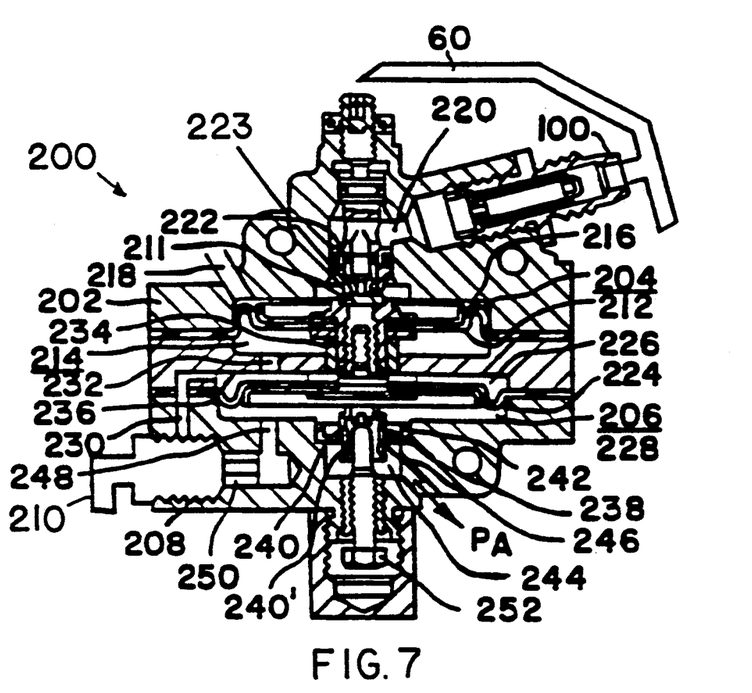
FIG. 7 is an enlarged view of the fuel schedule override means of FIG. 2 in a closed position.

The fuel schedule override means 200 as best shown in the enlarged drawings of FIGS. 6 and 7 has a housing 202 with first and second cavities 204 and 206 located therein. A first diaphragm 212 separates cavity 204 into a compressor discharge chamber 214 and an environment chamber 216. An opening 218 in housing 202 allows air from the surrounding environment having a fluid pressure $P_a$ to freely communicate with chamber 216. Housing 202 has a bore 220 with a restriction 222 located therein. Inlet port 100 from conduit 60 communicates operational fluid to bore 220 while restriction 222 allows the operational fluid to vent to environmental chamber 216. A second diaphragm 224 separates cavity 206 into a compressor discharge chamber 226 and a control chamber 228. Passageway 230 connects compressor discharge chamber 226 with inlet port 208 for conduit 210 attached to air supply or compressor discharge fluid conduit 38. Internal passages 232 in housing 202 connects chamber 226 with chamber 214 such that the compressor discharge fluid pressure $P_c$ is simultaneously present in both chambers. Diaphragm 212 which has an area of $A_1$ is connected to diaphragm 224 which has an area of $A_2$ by a cylindrical member 234 attached thereto which extends through bearing wall 236 in housing 202. A cylindrical member 238 attached to diaphragm 224 has a series of slots or openings 240, 240' that extend through an annular seat 242 in housing 202. Annular seat 242 forms the opening for bore 244 which is connected to the surrounding environment by opening 246. The slots or openings 240, 240' and annular seat 242 form a variable opening between the control chamber 228 and the bore 244. A passage 248 downstream from restriction 250 in inlet port 208 connects control chamber 228 with conduit 210. An adjustment mechanism 252 attached to housing 202 has an end that extends into cylindrical member 238 to act as a stop which limits the movement of diaphragm 224 toward the control chamber 228 and thus assures that some operational fluid flow can always take place through slots or openings 240, 240' through annular seat 242 and bore 244.

Figure 3:
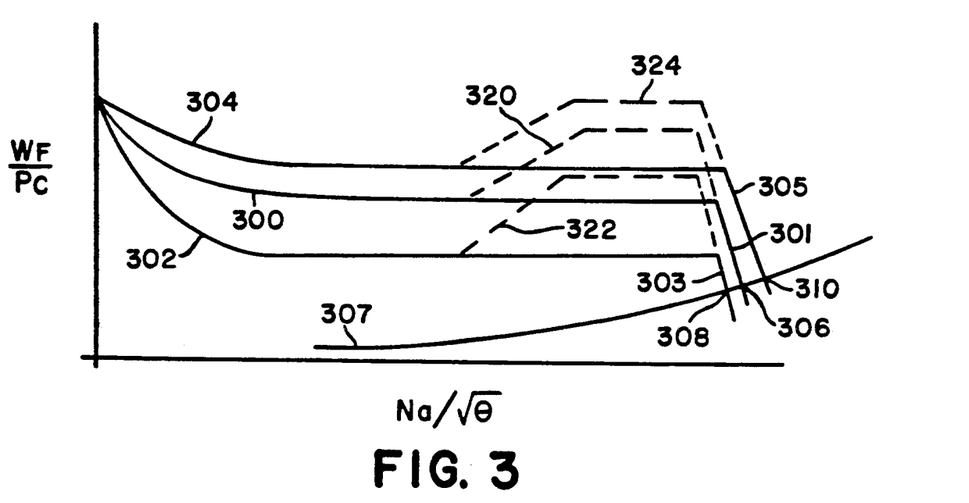
FIG. 3 is a graph illustrating the relationship between fuel supplied to operate the gas turbine and the corresponding speed resulting of a turbine engine from such speed.
Figure 4:
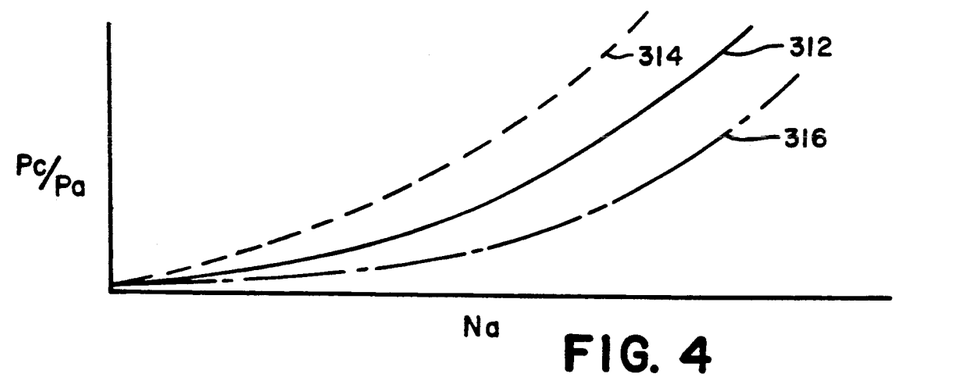
FIG. 4 is a graph showing the relationship of the compressor discharge pressure for the turbine and the pressure of the surrounding environment with respect to corrected rotational speed of the compressor.

In all turbine engines there exists a fuel flow schedule which can produce an optimum rate of acceleration with respect to temperature and altitude taking into consideration safe internal temperatures and surging of the compressor. Curve 300 in FIG. 3 illustrates a fuel flow schedule vs corrected $(N/\sqrt{\theta})$ for turbine 20 based on a temperature of 59° F. and sea level operation. When a turbine engine 20 is used in an aircraft, the temperature of the surrounding environment can vary from arctic to desert conditions while the pressure of the surrounding environment can vary from sea level at 20,000 feet. Curve 302 illustrates a fuel supply schedule when the operational conditions are −65° F. while curve 304 illustrates a fuel supply schedule when operational conditions are 120° F. As can be readily appreciated, once a compressor speed has reached a set speed at which the governor is activated, the governor control 76 reduces the amount of fuel that is supplied to the combustion chamber 26 until the corresponding governor curves 301, 303, and 305 intersect the required to run curve 307 as shown by points 306, 308 and 310, respectively, in FIG. 3. From experimentation it has been determined that the relationship of compressor discharge fluid pressure and surrounding environment fluid pressure to actual speed Na for the compressor 28 for a standard fuel schedule at sea level and calibrated at 59° F. follows a curve 312 as illustrated in FIG. 4.

Curve 314 illustrates this same relationship when operating conditions are −65° F. while curve 316 illustrates this relationship when operating conditions are 120° F. However, when this relationship between compressor discharge pressure and temperature is plotted against corrected speed a single uniform curve is produced. From this relationship, it is evident that the pressure override means 200 operates a direct function of corrected speed $N/\sqrt{\theta}$.

During normal operation with power lever 94 at a desired operational position, compressor 28 is powered by the expansion and flow of exhaust gases out of the combustion chamber 26. A portion of the compressor discharge fluid or air is bled off through conduit 38 to provide the operational fluid for the fuel control system 34. The fluid pressure $P_c$ in the operational fluid is modified by the temperature compensator 40. The position of contoured face 52 with respect to annular seat 54 restricts the flow of operational fluid through outlet port 46 into conduit 60 such that a fluid pressure $P_x$ is produced therein. Fluid pressure $P_x$ is communicated from inlet port 48 through passageway 62 to chamber 64. At the same time a portion of the operational fluid in conduit 60 flows through restriction 222 to environmental chamber 216 in the override means 200 and restriction 49 in the metering valve 36. In addition, restriction 217 allows some compressor discharge fluid to directly flow from conduit 210 to supply conduit 60. Operational fluid having a fluid pressure $P_x$ flows through restriction 70 and is communicated to chamber 68 in the metering valve 36 and to the surrounding environment through the opening in restricter 74. Operational fluid flows from opening in restricter 74 at a controlled rate dependent on the space relationship between face 75 on end 99 of lever arrangement 103 and the opening of restricter 74 to produce a fluid pressure $P_y$ therein which is communicated to chamber 68 by passageway 72. A pressure differential across bellows 66 provides linkage 35 with an input that moves the main fuel control mechanism 33 to allow fuel from the supply conduit 31 to flow to the combustion chamber 26 by way of conduit 37.

Figure 2:
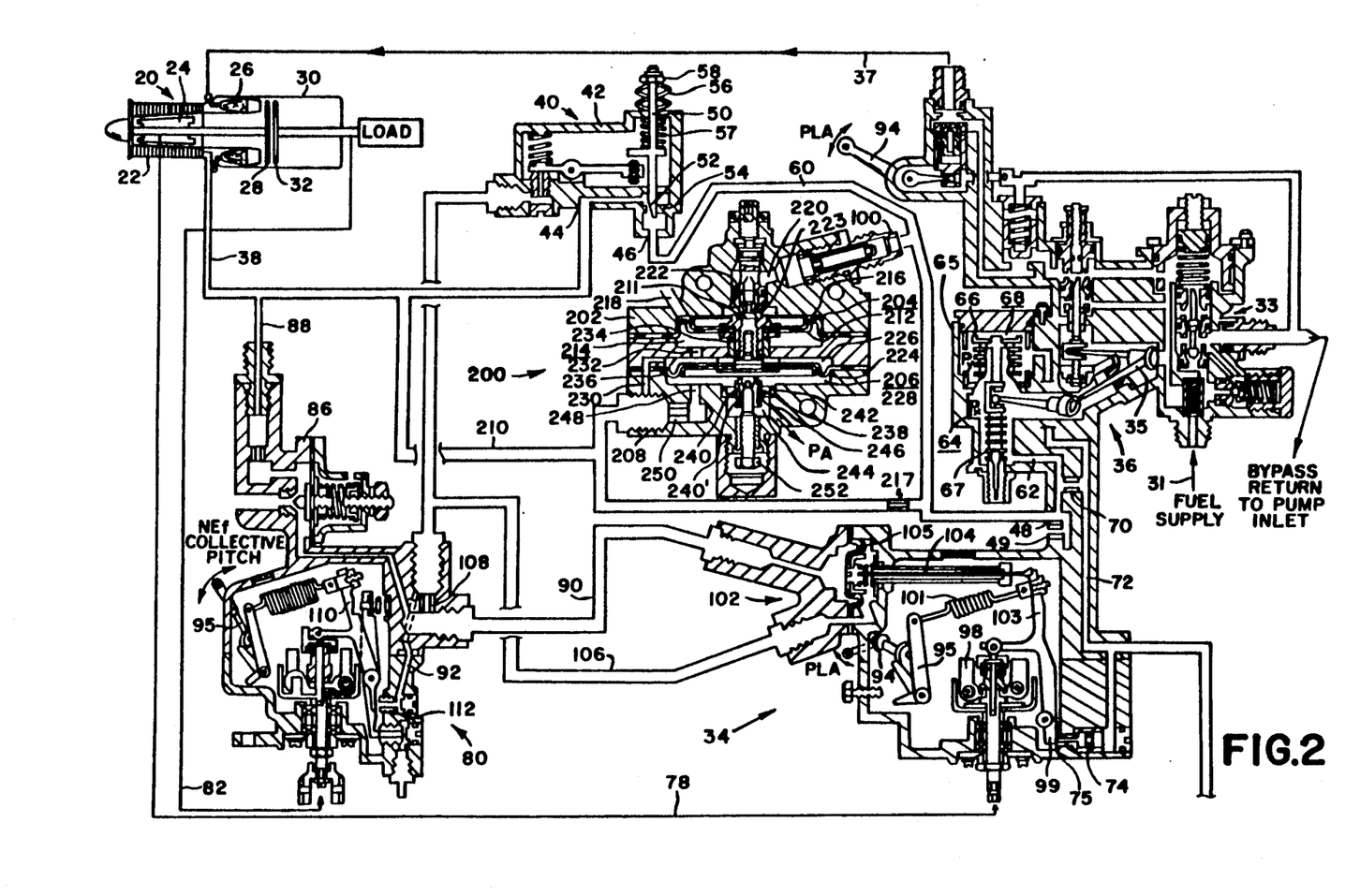
FIG. 2 is a schematic illustration of the fuel control system of FIG. 1, wherein the metering valve is supplied with an enhanced operational signal according to the invention disclosed herein.

During this operation, chambers 226 and 214 in the fuel schedule override means 200 receive fluid pressure $P_c$ from conduit 210 while restrictor 250 delays or limits the flow of compressor discharge fluid into control chamber 228. The size of the opening created by slots 240 and 240' and annular seat 242 controls the flow rate of the compressor discharge fluid out of the control chamber 228 to the surrounding environment by way of outlet port 246 to create a fluid pressure $P_s$ in chamber 228. With fluid pressure $P_c$ in chamber 226 and fluid pressure $P_s$ in chamber 228, a pressure differential $(P_c - P_s)$ is created across an area $A_2$ of diaphragm 224. At the same time fluid pressure $P_c$ in chamber 214 and surrounding environment pressure $P_a$ in chamber 216, a pressure differential $(P_c - P_a)$ is created across an area $A_1$ of diaphragm 212. Since $A_1$ for diaphragm 214 is smaller than $A_2$ for diaphragm 224, the force created by the pressure differential $(P_c - P_a)A_1$ is less than the force $(P_c - P_s)A_2$ and as a result the second diaphragm 224 moves toward stop 252 in the control chamber 228. As the diaphragm 224 moves toward stop 252, the openings of slots 240, 240' are correspondingly reduced such that the fluid pressure $P_s$ in chamber 228 increases. As $P_s$ approaches $P_c$, the force acting on area $A_2$ of diaphragm 224 is reduced such that at some point, the force acting on area $A_1$ of diaphragm 212 moves face 211 against the seat 223 of the outlet of restriction 222 to prevent the flow of modified operational fluid $P_x$ to the surrounding environment as shown in FIGS. 2 and 7. However, as diaphragm 224 moves away from stop 252, openings 240, 240' increase to lower the fluid pressure $P_s$ and again create a force across the diaphragm 224 such that the opening of seat 223 in restriction 222 is again uncovered.

When an operator moves the power lever 94 to an acceleration position, as shown in FIG. 2, the force applied through lever 95 to spring 101 is sufficient to move face 75 on the end 99 on lever arrangement 103 against the seat surrounding the opening of deceleration restricter 74 to interrupt the flow of modified operational fluid from passage 72 and allow the fluid pressure $P_y$ therein to increase to $P_x'$. With a fluid pressure $P_x'$ in chamber 68, the pressure differential $(P_x' - P_x')$ across bellows 66 is substantially eliminated and the force of $P_x'$ acting on the acceleration bellows 67 of bellow means 66 now moves linkage 35 to provide metering valve 36 with an input which allows additional fuel to flow to the combustion chamber 26 to meet the acceleration demand. This additional fuel flow is illustrated on curve 300 by the dash line 320 for the standard fuel schedule, by dash line 322 on curve 302 for the −65° F. fuel schedule operation and by dash line 324 on curve 304 for the 120° F. fuel schedule operation in FIG. 3. This pressure differential function of the override means 200 allows the fuel control system to operate outside of a normal fuel supply schedule during an acceleration period of operation.

The operation of the override means 200 shown in FIG. 1 is based on the mechanical relationship of a pressure differential switch, however in the future, electronic fuel controls most probably will be employed to supply a combustion chamber 26 with fuel in accordance with an operational schedule. One such electronic override means is shown in FIG. 5, wherein a computer 400 receives the following inputs: the speed $N_a$ of the compressor 28 and the temperature T of the surrounding environment.

The computer 400 evaluates the relationship of these operational parameters with respect to a set fuel schedule such as the standard fuel schedule 300 shown in FIG. 3. Should an operator request additional power from the turbine 20, the computer 400 evaluates the request. After a set speed for the turbine 28 has been achieved according to the fuel schedule, the computer 400 supplies valve 402 with an input signal which activates solenoid 422 of an actuator means 420 to proportionally move face 404 on plunger 418 toward seat 406 surrounding orifice or opening 410 to modulate the flow of operational fluid through chamber 414 in housing 424 from conduit 408 connected to conduit 60. The size of openings 412, 412' which control the flow of operational fluid from chamber 414 to the surrounding environment establish the fluid pressure Px in conduit 60. However, with orifice 410 restricted, the fluid pressure in the operational fluid presented to a metering valve 36 now increases to $P_x'$. This increase in operational fluid pressure $P_x'$ acts on bellow means 66 to create a force which moves linkage 35 to a position which opens metering valve 36 and allows additional fuel to be supplied to the combustion chamber 26 to meet this acceleration demand according to fuel control schedule 320, 322 and 324 shown in FIG. 3.

Figure 5:
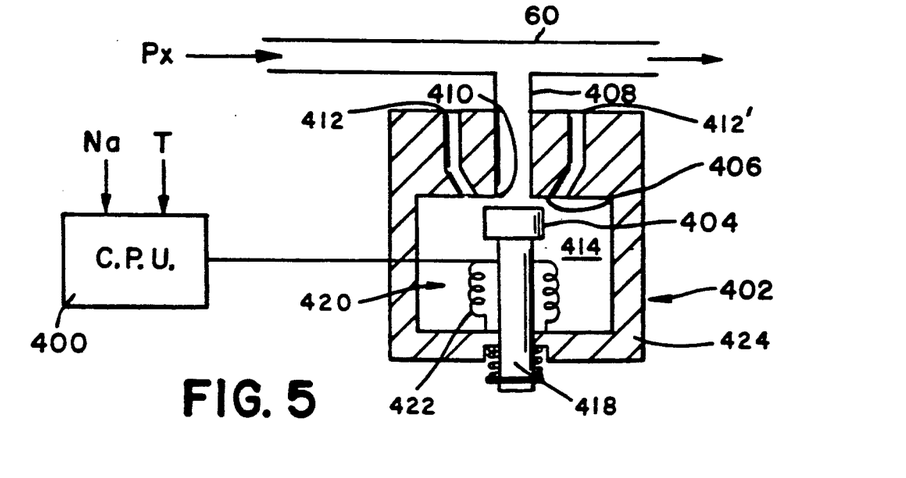
FIG. 5 is a schematic illustration of a control system wherein an electronic system has replaced the pressure switch in the fuel control system of FIG. 1.
Figure 8:
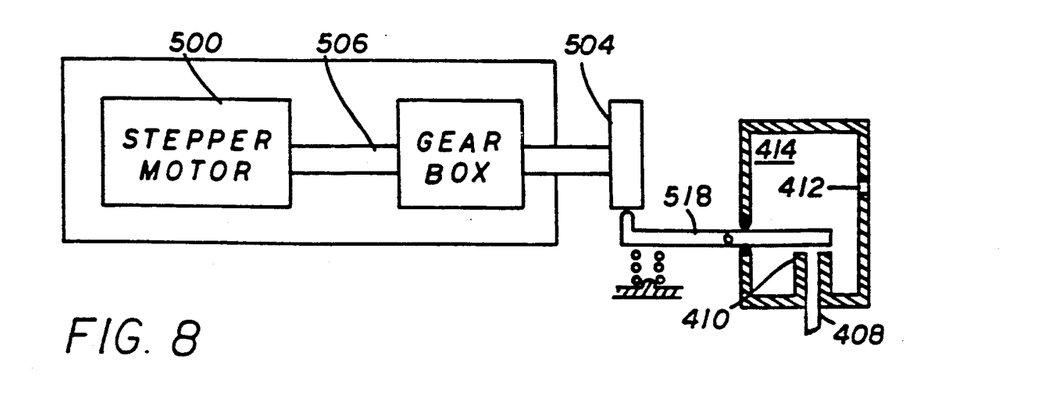
FIG. 8 is a schematic illustration of a stepper motor system for operating the valve means of FIG. 5.
Figure 10:
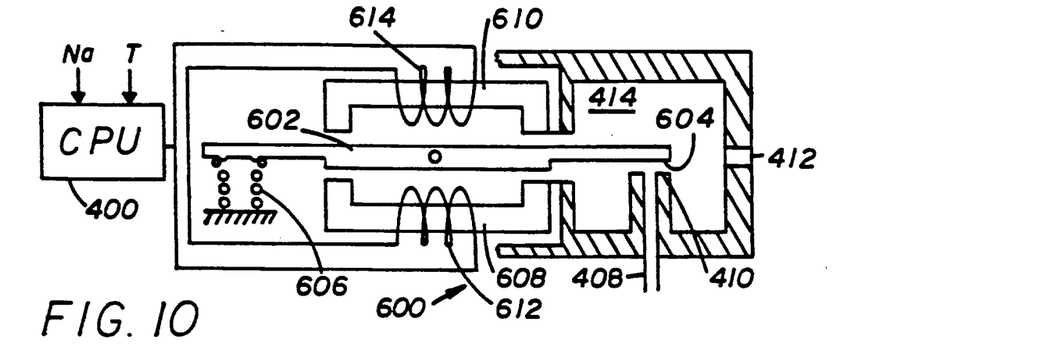
FIG. 10 is a schematic illustration of a torque motor system for operating the valve means of FIG. 5.

Further, under some conditions it is anticipated that the solenoid 422 shown in FIG. 5 could be replaced with a different actuator means such as steeper motor 500 as schematically shown in FIG. 8 which is sequentially moved to restrict the flow of operational fluid through orifice 410 or a torque motor 600 as schematically shown in FIG. 10 that responds to a signal to sequentially restrict the flow of operational fluid through orifice 410.

Figure 9:
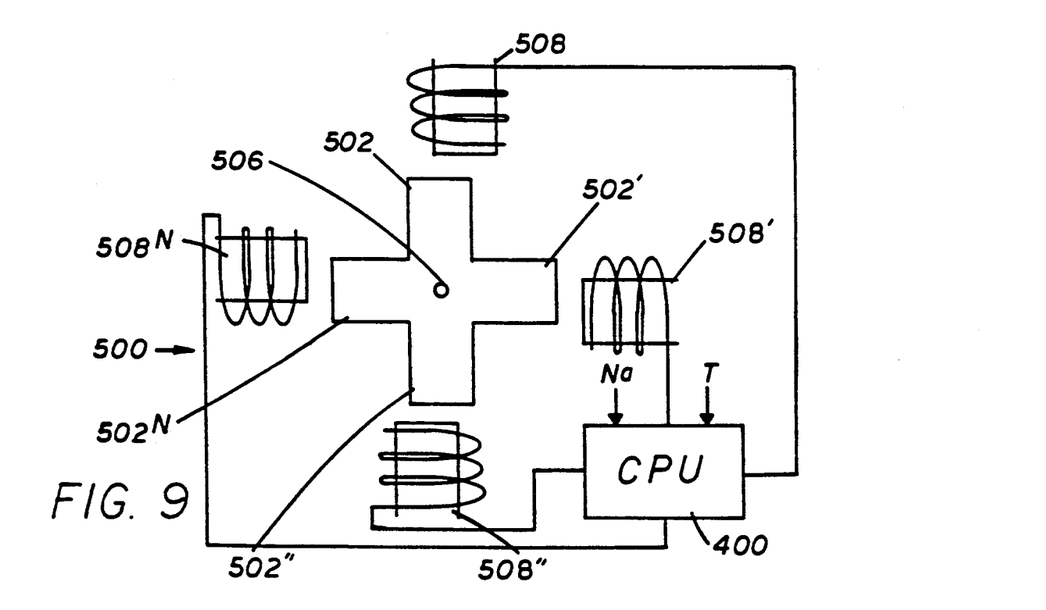
FIG. 9 is an end view of a schematic of an end view of a stepper motor for the system of FIG. 8.

The stepper motor 500 schematically shown in FIGS. 8 and 9 has a central shaft 506 surrounded by a series of magnets 502, 502', 502" and 502$^N$. The shaft 506 is connected to a lever member 518 by a cam member 504. Coils 508, 508' . . . 508$^N$ are sequentially activated by input signals from cpu 400 to rotate the shaft 506 in a series of discrete steps to move end 520 on lever 518 toward orifice 410 to restrict the flow of operational fluid from conduit 408 to develop the operational fluid pressure Px' which activates bellow means 66 to operate the metering valve 36 to supply additional fuel to combustion chamber 26.

The torque motor 600 shown in FIG. 9 has an armature or lever arm 602 with a face 604 located in chamber 414 adjacent orifice 410. Spring 606 positions face 604 on lever arm 602 with respect to orifice 410. A series of magnets 608 and 610 are positioned adjacent the lever arm or armature 602. Coils 612 and 614 which surround magnets 608 and 610 are connected to the cpu 400. In response to an input from the cpu 400, an electric field is produced in the coils 612 and 614 which acts on the armature or lever arm 602 to overcome spring 606 and position face 604 with respect to orifice 410 and develop fluid pressure Px' in the operational fluid in conduit 408. With fluid pressure Px' presented to bellow means 66, metering valve 36 can supply chamber 26 with fuel corresponding to fuel schedule 320, 322 and 324 shown in FIG. 3.

I claim:

1. In a gas turbine having at least one compressor, a housing with a first chamber and a second chamber located therein, a main fuel passage connected to a source of fuel, a metering valve located in said main fuel passage for controlling the flow of fuel from the source to a combustion chamber, said compressor rotating as a result of the combustion of fuel in the combustion chamber to develop a compressor discharge pressure $P_c$ in an operational fluid, a control system for operating said metering valve in accordance with a fuel supply schedule corresponding to a desired rotational speed for said compressor, temperature responsive means for modifying said compressor discharge pressure in said operational fluid from $P_c$ to $P_x$, bellow means for separating said first chamber from said second chamber and connected to said metering valve, a first passageway connected to said temperature responsive means for communicating said operational fluid having modified compressor discharge pressure $P_x$ to said first chamber, a second passageway connecting said first passageway to said second chamber, said first passageway having a first bleed orifice located therein and said second passageway having a second bleed orifice located therein, a lever arrangement having a face on the end thereof located adjacent said second bleed orifice and responsive to an input signal applied to a power lever by an operator, said lever arrangement being responsive to the rotational speed of said compressor for controlling flow of operational fluid from said second passageway through said second bleed orifice to establish a fluid pressure $P_y$ in the operational fluid presented to said second chamber, said bellow means responding to a pressure differential $P_x - P_y$ created in the operational fluid by the modified compressor fluid pressure $P_x$ in the first chamber and fluid pressure $P_y$ in the second chamber to provide said metering valve with an operational input to limit the maximum fuel supplied to said turbine according to said fuel supply schedule, the improvement comprising:

means responsive to a desired acceleration of said compressor above a predetrmined rotational speed different than that produced by said fuel supply schedule and with said lever arrangement having moved said face to seal said second bleed orifice to terminate the establishment of fluid pressure Py for initiating communication of operational fluid to said first and second chambers having a further modified fluid pressure $P_x'$, said bellow means responding to said further modified fluid pressure Px' by transmitting an operational signal to said metering valve whereby additional fuel is supplied to said combustion chamber according to a new fuel supply schedule corresponding to the actual speed of said turbine corrected for temperature and altitude.

2. The gas turbine as recited in claim 1 further including:
a first restriction located between said first and second passageways to control the rate of the flow of operational fluid to the second chamber.

3. The gas turbine as recited in claim 2 wherein said means for initiating communication of operational fluid having a further modified fluid pressure $P_x'$ comprises:
a pressure responsive switch having movable wall means with a first member with an area $A_1$ responsive to a difference between the modified compressor discharge fluid pressure $P_x$ and a fluid pressure $P_a$ in the surrounding environment $(P_x - P_a)$ and a second member with an area $A_2$ responsive a difference between the compressor discharge fluid pressure $P_c$ and a fluid pressure $P_s$ created by the flow of operational fluid through a variable restriction to the surrounding environment $(P_c - P_s)$, said first member being a different size than said second member such that the force produced by $P_c - P_a$ acting on said first member moves the wall means to interrupt the communication of the modified fluid pressure $P_x$ to the surrounding environment when the variable fluid pressure $P_s$ approaches the compressor discharge fluid pressure $P_c$.

4. The gas turbine as recited in claim 3 wherein said first member is a first diaphragm that separates a first compressor discharge chamber from an environmental chamber, said first diaphragm having a face thereon and said second member is a second diaphragm that separates a second compressor discharge chamber from a control chamber, said second diagram being connected to a cylindrical body that extends through an opening in the control chamber, said cylindrical body having a series of axial slots that progressively limit the size of a flow path from control chamber to the surrounding environment to establish said variable restriction.

5. The gas turbine as recited in claim 4 further including:
a second restriction that allows operational fluid to flow from said temperature responsive means into said environmental chamber to aid in the establishment of said modified fluid pressure $P_x$.

6. The gas turbine as recited in claim 5 wherein said face on said first diaphragm engages a seat on said second restriction to terminate the flow of operational fluid therethrough and thereby increase the fluid pressure of the operational fluid presented to said bellow means to $P_x'$, said increase in fluid pressure to $P_x'$ providing for an immediate response from said bellow means to activate said metering valve to increase the supply of fuel to the combustion chamber.

7. The gas turbine as recited in claim 2 wherein said means for initiating communication of operational fluid having a further modified fluid pressure $P_x'$ to said bellow means comprises:

computer means for receiving a first input corresponding to the rotational speed and a second input corresponding to engine air inlet temperature, said computer means modifying rotational speed as a function of temperature and speed;

valve means having a control chamber with an opening, said valve means allowing restrictive flow of operational fluid to the surrounding environment to modifying said compressor discharge pressure in said operational fluid presented to said bellow means from $P_c$ to $P_x$; and actuator means connected to said computer means and valve means for further restricting the flow of operational fluid through said opening in said control chamber and thereafter creating said further modified fluid pressure $P_x'$ in the operational fluid communicated to said bellow means to control the operation of said metering valve (36).

8. The gas turbine as recited in claim 7 wherein said actuator means is a torque motor which is driven by an input signal from said computer means.

9. The gas turbine as recited in claim 8 wherein said actuator means is a stepper motor driven by an input signal from said computer means.

10. The gas turbine as recited in claim 9 wherein said actuator means is a proportional solenoid driven by an input from said computer means.

* * * * *